Aug. 26, 1952 C. L. HINKSON 2,608,017
FISHING SINKER
Filed April 5, 1947 4 Sheets-Sheet 1
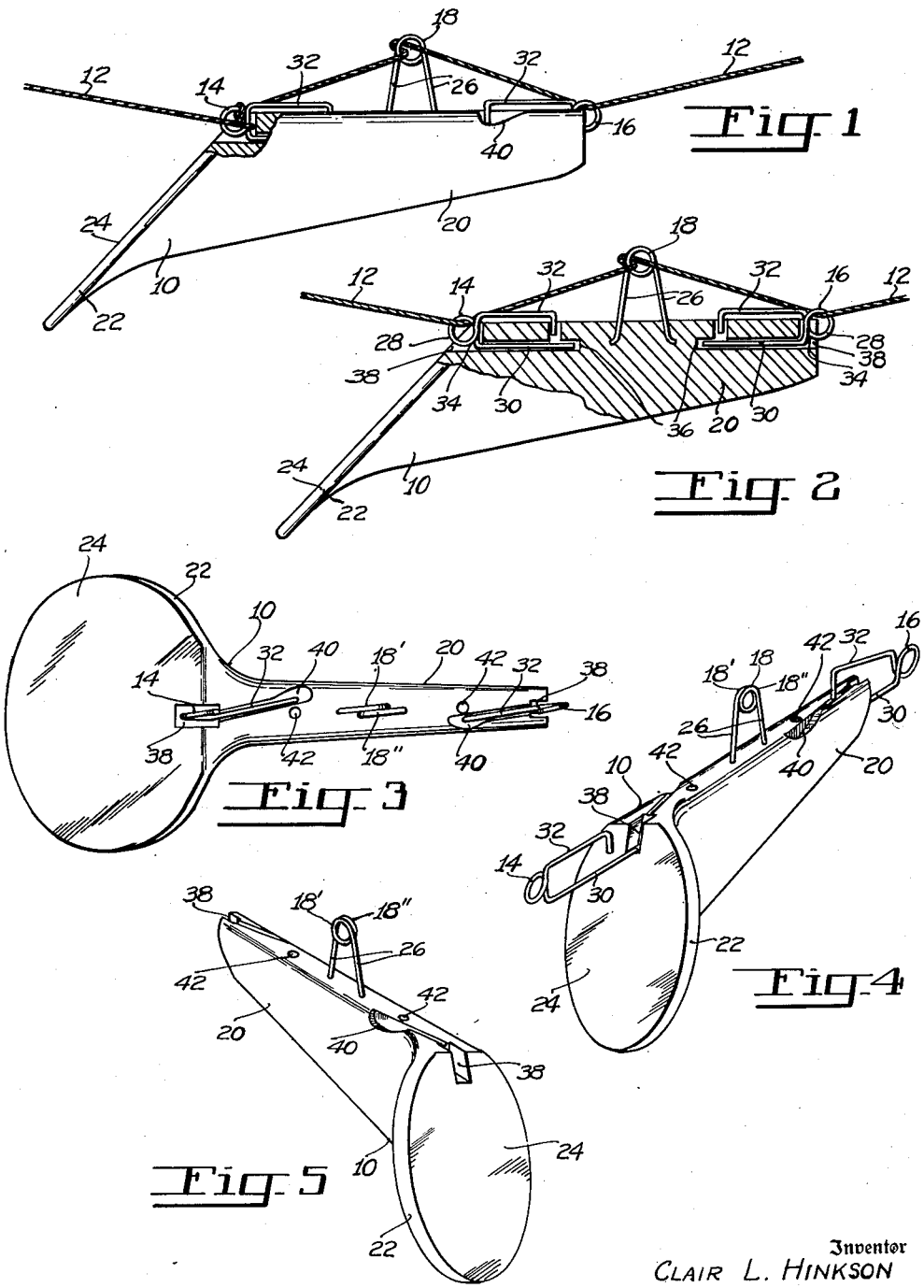
Inventor
CLAIR L. HINKSON
By Reynolds + Beach
Attorneys

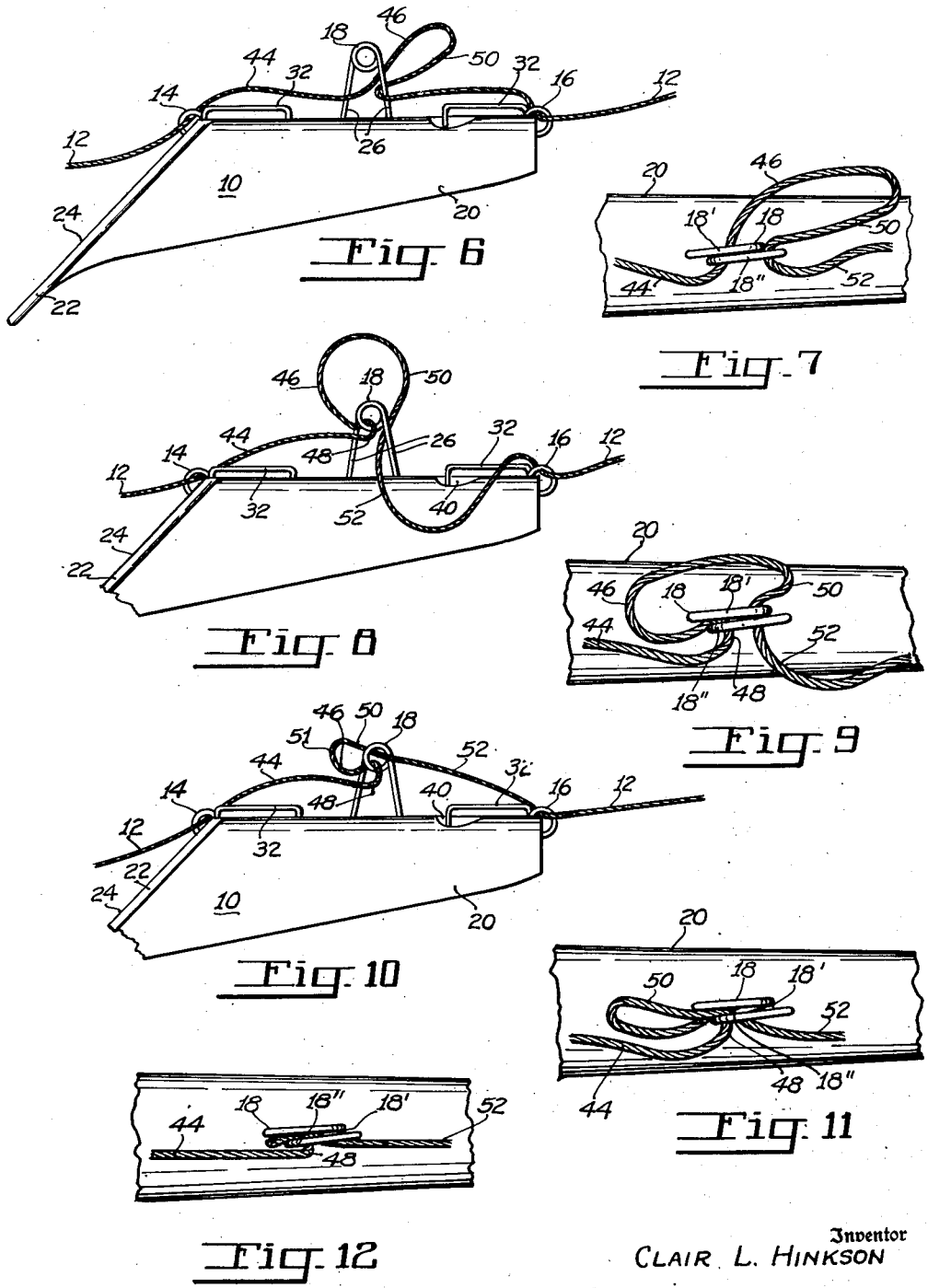

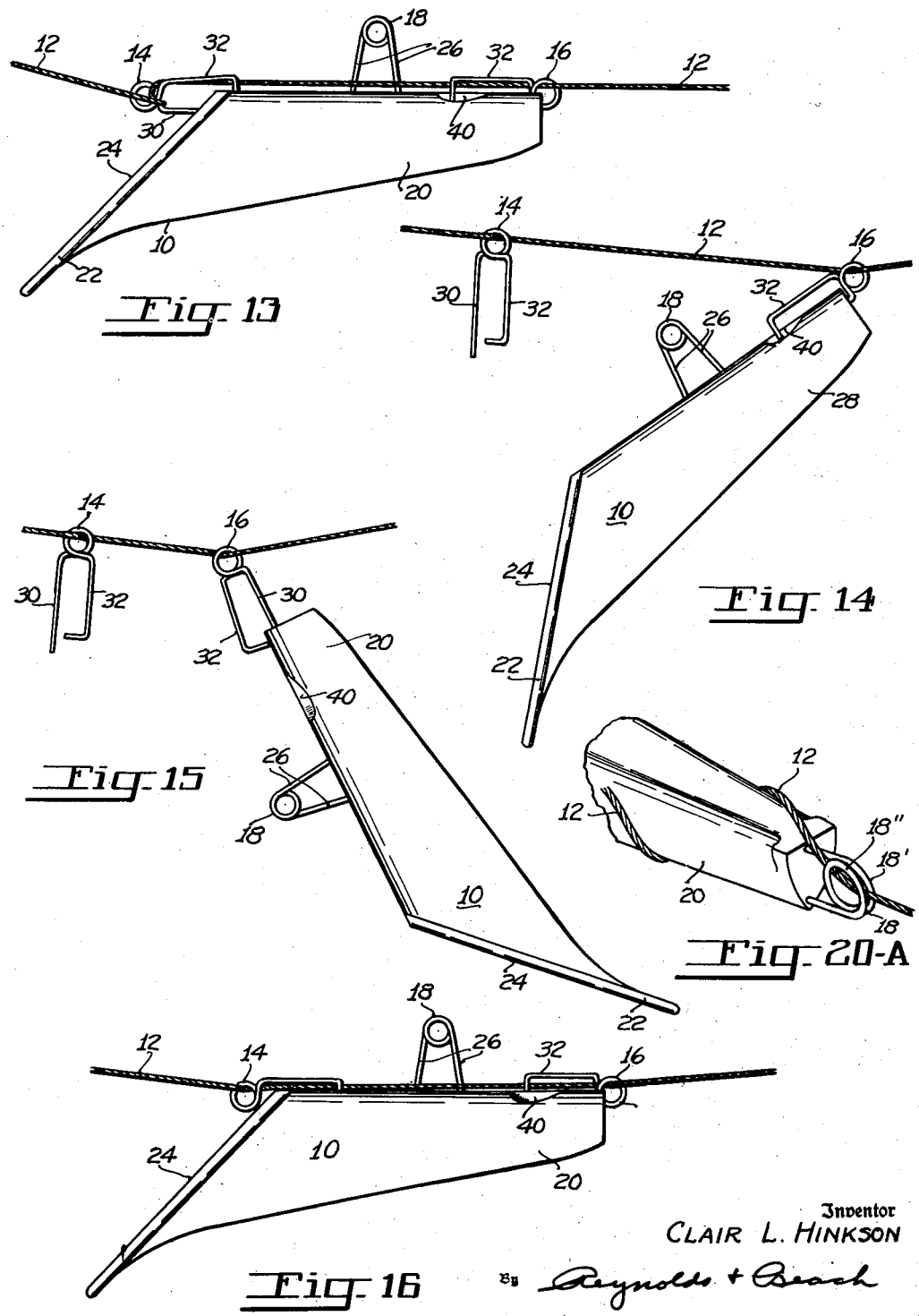

Aug. 26, 1952     C. L. HINKSON     2,608,017
FISHING SINKER
Filed April 5, 1947     4 Sheets-Sheet 4
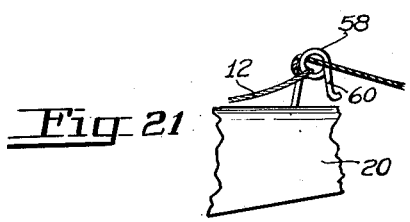
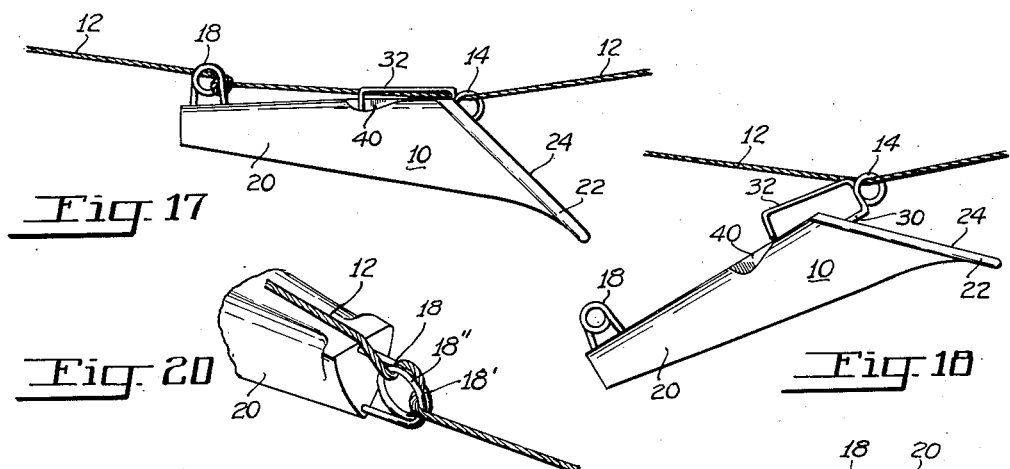
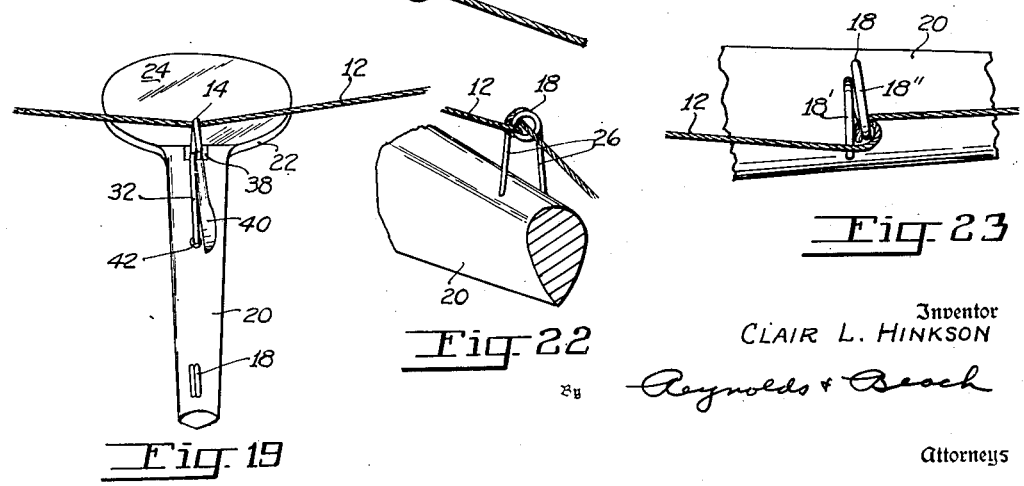
Inventor
CLAIR L. HINKSON
By Reynolds & Beach
Attorneys Patented Aug. 26, 1952

2,608,017

UNITED STATES PATENT OFFICE 2,608,017

FISHING SINKER

Clair L. Hinkson, Seattle, Wash., assignor to Hinkson Mfg. Co., Seattle, Wash., a partnership Application April 5, 1947, Serial No. 739,589

6 Claims. (Cl. 43—44.88)

This invention relates to trolling sinkers used in fishing, of a type adapted to be released for sliding down the line or to be detached completely therefrom, when a fish strikes. In illustrated forms of the invention the sinker is adapted for connection to the line to effect either type of release, depending upon the desire of the fisherman to expend or jettison the weight completely to enhance the sport of playing the fish and the likelihood of catching same, or to conserve the weight for subsequent use. In the latter case of slidable release, where the weight merely slides down the line to near the hook end, the fisherman is thereby permitted to reel in the line through the pole tip guide up to the leader or further, and is also otherwise better able to sense movements of the fish than were the weight to intervene, it being noted that in salmon fishing and the like it is usually desirable to have a considerable length of line and/or leader between sinker and hook.

The principal object of the invention is to provide an improved fishing sinker adapted for use, at the choice of the fisherman, either as a slide sinker or as a detachable sinker in landing a fish. Another object is to provide sinker weight means and coacting line guide means detachable from such weight means, and to provide an improved arrangement of sinker weight, line clip means and line guide means in sinkers of the releasable type.

A further object is to provide an improved sinker of the releasable type wherein the forward stretch of line may be pulled much harder than may the trailing stretch, before release of the line from the sinker clip means occurs. This is a desirable feature in preventing accidental release of the sinker by forces, such as those normally resulting from striking submerged obstacles, and at the same time in allowing a fish to release the sinker readily.

The invention, including various novel features thereof and details of construction, will now be described by reference to the accompanying drawings and thereafter will be pointed out in the appended claims.

Figure 1 is a side elevation view of one form of sinker embodying the invention, shown connected to a fishing line for expenditure of the sinker weight when a fish strikes. Figure 2 is a side view of the same sinker, shown partly in longitudinal section, connected to be released only for sliding along the line when a fish strikes, and Figures 3, 4, and 5 are a plan view and perspective views respectively, of the same sinker showing its various details of construction.

Figures 6, 8 and 10 are side elevation views, and Figures 7, 9 and 11 are corresponding fragmentary plan views, illustrating the steps of the preferred method of connecting the line to the sinker clip, Figure 12 being a fragmentary plan view showing the final connection. Figures 13 to 15, inclusive, are views showing the succeeding stages in the process by which the sinker weight is expended or jettisoned from the line when the sinker has previously been rigged as shown in Figure 1 and the line released from the clip by the strike of a fish.

Figure 16 is a side elevation view showing the relationship of the same sinker to the line when the sinker has been rigged as in Figure 2 and released for sliding down the line.

Figure 17 is a side elevation view of a modified form of sinker embodying features of the invention, in which form it is adapted to be released either for sliding or for expenditure, as desired. In this figure it is shown connected for the latter type of release. Figure 18 is a fragmentary side elevation view of the same sinker during process of being jettisoned from the line, and Figure 19 is a plan view of the same sinker when released only for sliding along the line.

Figure 20 is a fragmentary end perspective view showing an alternative position of the sinker line clip, in a sinker of the Figure 17 type, and Figure 20A shows a different hitch.

Figure 21 is a fragmentary side elevation view of a sinker having a modified form of line clip.

Figure 22 is a fragmentary perspective view showing an alternative positioning or orientation of the line clip relative to the main axis of a sinker weight member, and Figure 23 is a fragmentary plan view of the same, showing the preferred manner of holding the line in the clip.

In accordance with the illustrated construction of the sinker, as in Figures 1 to 5, inclusive, the weight member 10 is preferably in the form of an elongated body portion 20 tapering rearwardly from its forward end, which is faired into the rearward side of an enlarged head 22 in the form of a disc, the forward face 24 of which is flat, inclined forwardly and downwardly relative to the body axis. The weight member 10 is generally higher than it is wide, and is tapered downwardly to an angular lower edge, giving it somewhat of a keel-like appearance.

At the respective ends of the weight member, respectively, are positioned similar detachable line guides 14 and 16. Each of such guides comprises an eye-loop portion 28, a guide stem 30, and a hook portion 32 the shank of which is disposed generally parallel to the stem 30 and the hook end of which is turned inwardly toward such stem. These members are formed of resilient wire, and in their preferred, illustrated form they are constructed with the running ends of their eye-loops 28 crossed in joining the hooks 32 and guide stems 30, there being a sharply reentrant angle indicated at 34, formed in the crossover.

The line clip 18, positioned generally midway between the ends of the sinker, comprises a length of resilient wire the ends 26 of which are embedded in the side of the weight member, projecting outwardly therefrom and joining the ends of a coil portion comprising a clip 18. The coil has substantially one and one half turns of wire, the clip jaws 18' and 18" being the adjacent coil turns or sections. The spacing between the inner coil convolution and the side of the weight member is not critical but is sufficient to pass a bight of line between the ends or legs 26 of the clip, beneath the coil. A loop of line inserted in the clip between the adjacent coil sections, or clip jaws will be pinched and held there, by the resilient force of the clip, against the ordinary working tension in the line tending to release it from the clip.

For receiving the line guides the weight member 10 is provided at its ends with longitudinally extending guide-stem holes 36 opening into notches 38 in the ends of the sinker body 20, in which are inserted the bases of the eye-loops 28. Also provided are recesses 40 and adjacently located hook-retaining sockets 42, into which alternatively may be lodged the corresponding guide hooks at the ends of the sinker. The recesses increase in depth away from the ends of the sinker, which conformation tends to hold the guide hooks placed therein, thereby preventing the guides from slipping out of place of their own accord or with only slight pull on the line applied to the guide. However, with the ends of the hooks in their alternate positions, namely in the sockets 42, the guides may not be withdrawn from the weight member 10, which is the case when it has been elected to conserve the sinker weight upon release of the line from the clip 18. Principally as a convenience in forming the weight member 10, the socket holes 42 are substantially centrally located of the weight and the recesses 40 are disposed eccentrically and are inclined from the notches 38 outwardly toward the opposite sides of the body, respectively.

In Figure 4 the forward guide 14 has been shown withdrawn from the sinker, and the rear guide member 16 partly withdrawn. With the end of a guide hook retained in its socket the corresponding guide eye-loop is normally resting well within the corresponding notch 38, with only the forward portion of the eye-loop projecting outwardly therefrom.

In Figure 1 the guide hooks are shown engaging their corresponding recesses, and the line has been so rigged in the clip and guides and secured to the forward guide 14, that the sinker weight member may be expended, completely released from the guides and line, when the line has been pulled from the clip by the force of the strike of a fish tensioning the trailing stretch of line passing from the clip through the eye of the rear guide. In the illustrated manner of securing or hitching the line to the forward guide, the line, which has first been threaded through the eye-loop by pressing it through the crossover, is wrapped around the guide at and wedged into the crossover where it is held while pulling the sinker through the water. While the line is held in the clip behind the forward guide such guide may not be pulled from the weight member. When the line is released from the clip, the forward guide may be pulled free by a forward pull on the line, after which the weight will drop, swinging on the rear guide to drop free thereof.

In Figure 2, the guide hooks are shown engaging their corresponding sockets in the weight member, and the line has been rigged in the guides and clip so that the sinker may be free to slide down the line when a tug on the trailing end of the line releases it from the clip. In this case the line is simply threaded through the guide eyes, preferably by forcing it through the crossovers of the respective guides.

In rigging or connecting the line into pinching engagement with the clip 18 in the preferred manner, the following method is followed, as in Figures 6 through 12, where it is assumed that the line has already been threaded through the eyes of the guides 14 and 16. As a first step, a bight is formed and passed through the space between the clip legs 26 under the clip coil, from the side of the clip from which the rearward support or leg extends into the coil and thence around to the forward leg joining the other end of the coil, far enough to be grasped easily between the fingers from the other side of the clip, as in Figures 6 and 7. The next step is to grasp the leading stretch of line 44 in one hand and the forward side 46 of the bight in the other hand and then force the intervening line upwardly through the rear opening of the clip between the proximate coil section and rear leg thereof, forwardly through the clip's jaws and then downwardly to the point where that side of the bight escapes from the jaws. In this position the line is doubled back around the lower part of the coil convolution, as shown at 48 both in Figure 8 and Figure 9.

Following this, the other side of the bight 50 is drawn upwardly and forwardly through the clip jaws by tensioning the line between such side and the rearward stretch 52, bringing the line into the position shown in Figures 10 and 11, forming loop or bight 51 extending outwardly from the coil of the clip. In this position, at least the running end at the rear side of the loop is gripped tightly between the clip's jaws and the other, forward or downward end preferably is free so that it may be drawn in by a forward pull on the line 44.

The rigging of the clip is then completed by drawing the leading stretch of line 44 forwardly until the bight or loop 51 is brought to rest adjacent to the clip coil, preferably being wedged in the peripheral reentrant groove formed between the adjacent coil sections 18' and 18" comprising the clip jaws, as shown in Figure 12. A bight of line is thus clamped between the jaws of the clip and the trailing stretch of the line 52 proceeds freely and substantially linearly rearwardly from the clip whereas the forward or leading stretch of the line in proceeding forwardly must double back around the coil of the clip, through its eye. Because of the resulting difference in sliding friction applied to the forward and rearward stretches of line owing to the differences in angle of wrap of the line around the forward and rearward parts of the clip release of the line loop from the clip may be effected with less force in pulling on the trailing end of the line than on the leading end. These may differ by a factor of as much as four or more to one, depending upon the thickness and material of the line and the construction of the clip. This difference tends to prevent accidental release of the sinker when it is dragged against a submerged log or other obstacle in the water although it may be released readily by the strike of a fish.

When the fisherman elects to have the sinker jettisoned the line will be hitched to the forward clip, as described with reference to Figure 1, fixed in the line clip and threaded through the eye of the rear line guide. The guide hooks will be positioned in their corresponding weight recesses. During release of the sinker the line is first extracted from the clip, by the tug of a fish, the forward guide is next retracted from the weight member by pulling on the leading end of the line and then the weight of the sinker, aided by jerking the line, becomes effective to separate the weight member from the rear guide, enabling the weight member to drop to the bottom. This sequence may be seen from Figures 13 to 15, in which Figure 13 shows the line released from the clip and the forward line guide 14 partly withdrawn from the body 10. A sharp tug on the line by the fisherman will complete the release of this guide, because of the resistance to forward movement of the sinker owing particularly to the large area of its leading face. In Figure 14 the forward guide has been withdrawn completely and the sinker weight is in the process of dropping. The guide has been spun about by the tension of the line so that it is now unhitched and free to slide downwardly on the line. In Figure 15 the release of the weight member 10 has been substantially completed by reason of the pull on the rear guide resulting from the weight of the weight member aided by tugs on the line. When finally free of the rear guide the weight will drop and the line guides slide downwardly as the fish is played and landed. Later, the same line guides may be used in connecting another sinker weight to the line to resume fishing.

Alternatively, where it is desired to conserve the sinker weight for a subsequent use, the line is rigged by threading it through the guides and securing a line bight in the clip, and the guide hooks are positioned in their corresponding weight pockets. When released from the clip, by the strike of a fish, the line, after being thus connected, will straighten itself by tension, extending through the guides lengthwise of the sinker, as in Figure 16, and the sinker thereby will be enabled to slide downwardly to the trailing end of the line where it will offer little hinderance to the fisherman in landing the fish.

It is to be noted that a slidable release of the sinker may be effected also by inserting the forward guide hook in its recess, the rearward guide hook in its socket and then rigging the line as if it were to be jettisoned, namely threading it through the rear guide eye, hitching it to the front guide and pinching a bight of line in the clip. Upon release, the sinker will hang on the line from the rear guide, in vertical position, in which it will slide downwardly on the line.

For sinkers of smaller size a modified construction is preferred. This is shown in Figures 17 and 18, where the sinker comprises a similar weight member 10 and line clip 18 but only a single detachable guide 14, mounted forwardly of the line clip preferably at the upper leading edge of the sinker. With this type of sinker a bight of line is clamped between the jaws of the clip 18, as before, but the line need not be tied to the line guide, it being sufficient merely to pass it through the eye of such guide, where jettisoning the weight is desired. Figure 18 shows the line released from its clip 18 and the end of the sinker weight carrying the clip dropping away from the line, and the guide hook is being retracted from its recess 40. Alternatively the guide hook may be connected in its socket for slidable release of the sinker. In Figure 19, the same sinker is shown suspended from the line by the forward guide hook thus connected and threaded through by the line, after release of the line by the clip 18.

The further modified sinker the trailing end of which is shown in Figure 20 is similar to that of Figure 17 with the principal exception that the line clip projects rearwardly from the trailing end wall of the weight member 10 instead of outwardly from its side. The line may be held in the clip as before, by pinching a bight of line between the clip jaws. This may be accomplished by first inserting a bight through the opening beneath the coil of the clip from the side from which the lower leg of the clip proceeds into the coil and therearound to the other side of the clip where the coil joins the other, upper leg. Considering the upper leg as the forward leg in Figures 8, 9, 10, etc., the clip rigging procedure will be the same in completing the connection as described by reference to those figures. When thus connected, the line may be released readily by the tug of a fish and resisted relatively by pulls on the portion of the line forward of the clip. Such forward line portion will be deflected in passing from the clip 18 over the straight upper edge of the trailing end of the weight member 10, adding to the frictional resistance and thus making it more difficult to pull the line from the clip by a forward pull than by a rearward pull. The friction on the forward portion of the line may be further increased by wrapping it around the sinker body as shown in Fig. 20A, in which case the line may merely be passed straight between the jaws 18' and 18" of the clip 18, instead of clamping a bight of the line.

In any of the described forms of sinker the form of line clip may differ from that already described. Figure 21 shows one variation 58 in which one of the legs 60 or supporting members, the rearward one, of the clip described heretofore is spaced from the sinker body, making it possible to secure the line in the clip without threading a loop beneath its eye.

In Figures 22 and 23 another variation is shown, in which the form of the clip first described is preserved but the general plane of the clip loop is now disposed transversely of the long dimension of the sinker. This arrangement may be used with either type sinker, having front and rear line guides, or a front line guide alone, the clip projecting outwardly from the weight member. Various other intermediate angles of orientation of the clip between the positions shown respectively in Figures 1 and 22 may be employed if it be so desired.

With respect to the selected shape of the weight member, the inclined flat disc-like head, fairing into the tapered body portion, has a vane effect, making the sinker the equivalent of a much heavier sinker in determining the depth which it seeks in the water. Moreover, the large resistance of the sinker to sudden forward jerks on the line, created by its flat forward surface, facilitates the withdrawal of the forward line guide or other similar detachable line-engaging means from the sinker body after the line has been pulled from the clip upon the strike of a fish. Expending the sinker weight is not as costly with the form described as it might be with other forms where a greater amount of lead or other weight material would be required to sink the line to the same depth during trolling. However, various other forms of sinker are possible within the principles of the invention.

What I claim is:

1. The method of lodging a bight of fishing line releasably between parallel resilient coils of a sinker clip having a generally straight extension portion continuing from the end of one outer coil, comprising forming a line bight, passing such line bight through the re-entrant space defined between said extension portion and the adjacent side of said outer coil, circumferentially wedging one side of such bight between said outer coil and the adjacent coil, sliding such bight side circumferentially between and around the coils in the direction away from such re-entrant space, and finally drawing upon the line to shorten the bight and lay it along a segment of the peripheral groove formed between said adjacent coils pinching the line between them, the bight thus pinched between said coils being releasable therefrom by a pull on the line in excess of a predetermined force, sufficient to draw the bight completely through the pinching coil sides.

2. A fishing sinker comprising an elongated weight member, line guide means normally carried by one end of said weight member, and line clip means carried by said weight member at a location spaced lengthwise thereof from said clip means, said line guide means being separable from said weight member after release of the fishing line from said clip means, said separable line guide means comprising a line guide loop portion, a guide stem portion projecting from said loop portion, and a resilient hooked portion projecting from said loop portion generally parallel to said stem portion, the projecting end of said hooked portion being turned inwardly toward said stem portion, said one end of said weight member having therein a generally longitudinal hole receiving said stem portion, said weight member further having therein a side recess receiving the inturned projecting end of said hooked portion, such recess increasing in depth away from the stem-receiving end of the weight member, whereby the latter is gripped resiliently between said hook and stem portions, and the guide means is separable from the weight member by pulling such guide means longitudinally and away from said end of the weight member thus receiving such means.

3. The fishing sinker defined in claim 2 wherein the loop portion of the separable line guide means forms a closed eye-loop and the weight member further has an eye-loop-receiving notch in the entrance location of the stem-receiving hole.

4. A fishing sinker comprising an elongated weight member, line guide means normally carried by one end of said weight member, and line clip means carried by said weight member at a location spaced lengthwise thereof from said clip means, said line guide means being separable from said weight member after release of the fishing line from said clip means, said separable line guide means comprising a line guide loop portion, a guide stem portion projecting from said loop portion, and a resilient hooked portion projecting from said loop portion generally parallel to said stem portion, the projecting end of said hooked portion being turned inwardly toward said stem portion, said one end of said weight member having therein a generally longitudinal hole receiving said stem portion, said weight member further having therein a side socket receiving the inturned projecting end of said hooked portion to secure said guide means to said weight member until said inturned end is pulled from said socket at will.

5. The fishing sinker defined in claim 4 wherein the weight member additionally includes a side recess alternatively receiving the inturned projecting end of the hooked portion, such recess increasing in depth away from the stem-receiving end of the weight member, whereby the latter is gripped resiliently between said hooked and stem portions, and the guide means is separable from the weight member by pulling such guide means longitudinally away from said end of the weight member and thereby withdrawing said stem portion from the longitudinal hole in said weight member and simultaneously withdrawing said hooked portion from said side recess.

6. In a fishing sinker, an elongated weight member having in one end thereof a generally longitudinal bore of a depth equal to a substantial portion of the length of said weight member, said weight member further having therein a side bore extending transversely thereof generally perpendicular to said longitudinal bore and spaced from said end of the weight member by a substantial portion of its length, and said weight member further having an elongated side recess therein, substantially of maximum depth at the general lengthwise location of said side bore and gradually and progressively decreasing in depth toward said end of the weight member.

CLAIR L. HINKSON.

REFERENCES CITED

The following references are of record in the file of this patent:

UNITED STATES PATENTS

| Number | Name | Date |
|---|---|---|
| 188,755 | Redfield | Mar. 27, 1877 |
| 337,311 | Davis | Mar. 2, 1886 |
| 546,771 | Benoit | Sept. 24, 1895 |
| 656,431 | Stewart | Aug. 21, 1900 |
| 898,784 | Rosenberg | Sept. 15, 1908 |
| 993,773 | Grabau | May 30, 1911 |
| 1,193,077 | Schoonmaker | Aug. 1, 1916 |
| 1,338,953 | Odell | May 4, 1920 |
| 1,564,147 | Stickley | Dec. 1, 1925 |
| 2,115,302 | Chochard | Apr. 26, 1938 |
| 2,135,847 | Rosenquist | Nov. 8, 1938 |
| 2,163,936 | Cunningham | June 27, 1939 |
| 2,217,972 | Smith | Oct. 15, 1940 |
| 2,326,876 | Miller | Aug. 17, 1943 |
| 2,399,298 | Sevigny | Apr. 30, 1946 |
| 2,484,357 | Schwenk | Oct. 11, 1949 |

FOREIGN PATENTS

| Number | Country | Date |
|---|---|---|
| 361,078 | Great Britain | Nov. 19, 1931 |